United States Patent
Zaiwei et al.

(10) Patent No.: US 9,690,549 B2
(45) Date of Patent: Jun. 27, 2017

(54) EDITING SOFTWARE PRODUCTS USING TEXT MAPPING FILES

(71) Applicant: CA, Inc., New York, NY (US)

(72) Inventors: Xiong Zaiwei, Beijing (CN); Liu Yue, Beijing (CN); Geng Zhijie, Beijing (CN); Liang Huiping, Beijing (CN)

(73) Assignee: CA, INC., New York, NY (US)

( * ) Notice: Subject to any disclaimer, the term of this patent is extended or adjusted under 35 U.S.C. 154(b) by 0 days.

(21) Appl. No.: 14/668,035

(22) Filed: Mar. 25, 2015

(65) Prior Publication Data
US 2016/0283204 A1    Sep. 29, 2016

(51) Int. Cl.
*G06F 9/44* (2006.01)
*G06F 3/0484* (2013.01)
*G06F 3/0482* (2013.01)
*G06F 3/033* (2013.01)
*G06F 17/28* (2006.01)

(52) U.S. Cl.
CPC .............. *G06F 8/38* (2013.01); *G06F 3/033* (2013.01); *G06F 3/0482* (2013.01); *G06F 3/04842* (2013.01); *G06F 9/4448* (2013.01); *G06F 17/2836* (2013.01)

(58) Field of Classification Search
CPC ..... G06F 8/33; G06F 8/34; G06F 8/38; G06F 9/4448
See application file for complete search history.

(56) References Cited

U.S. PATENT DOCUMENTS

| | | | | |
|---|---|---|---|---|
| 5,678,039 A | * | 10/1997 | Hinks | G06F 9/4448 |
| 5,734,907 A | * | 3/1998 | Jarossay | G06F 8/31 |
| | | | | 717/114 |
| 5,930,809 A | * | 7/1999 | Middlebrook | G09B 5/065 |
| | | | | 345/685 |
| 5,991,534 A | * | 11/1999 | Hamilton | G06F 8/34 |
| | | | | 707/999.001 |
| 6,580,440 B1 | * | 6/2003 | Wagner | G06F 9/4443 |
| | | | | 715/762 |
| 6,763,517 B2 | * | 7/2004 | Hines | G06F 8/66 |
| | | | | 714/48 |

(Continued)

OTHER PUBLICATIONS

W3C Architecture Domain Internationalization, FAQ: Localization vs. Internationalization, pulished by W3C before 2007, pp. 1-2.*

(Continued)

*Primary Examiner* — Tuan Q. Dam
*Assistant Examiner* — Zheng Wei
(74) *Attorney, Agent, or Firm* — Sage Patent Group

(57) ABSTRACT

A GUI screen may include text fields, and a first resource file includes text strings for the text fields. A text mapping file may be generated to include a module for each text string, with each module including a text string from the resource file and a text string identification. A first screenshot of the GUI screen may include an original first text string from s first module and an original second text string from a second module. Responsive to receiving user input of a new first text string, the first module may be updated with the new first text string, and a second screenshot of the GUI screen may be provided including the new first text string from first module and the original second text string from the second module. A second resource file may then be provided including the new first text string.

21 Claims, 10 Drawing Sheets

(56) References Cited

U.S. PATENT DOCUMENTS

| | | | | |
|---|---|---|---|---|
| 6,802,055 B2* | 10/2004 | Jade | G06F 9/4448 | 345/619 |
| 6,825,859 B1* | 11/2004 | Severenuk | H04L 69/329 | 715/762 |
| 6,951,012 B2* | 9/2005 | McGeorge, Jr. | G06F 11/3476 | 714/E11.204 |
| 7,191,405 B1* | 3/2007 | Jaramillo | G06F 8/33 | 715/201 |
| 7,426,716 B2* | 9/2008 | Kung | G06F 8/75 | 717/104 |
| 7,447,624 B2* | 11/2008 | Fuhrmann | G06F 9/4448 | 704/2 |
| 7,613,789 B2* | 11/2009 | Cacenco | G06F 8/34 | 709/218 |
| 7,860,846 B2* | 12/2010 | Takahashi | G06F 9/4448 | 707/702 |
| 7,861,226 B1* | 12/2010 | Episkopos | G06F 11/3676 | 717/124 |
| 7,954,090 B1* | 5/2011 | Qureshi | G06N 5/048 | 714/25 |
| 7,979,850 B2* | 7/2011 | Ivanov | G06F 11/3476 | 714/45 |
| 7,992,129 B2* | 8/2011 | Chandhoke | G06F 8/34 | 700/181 |
| 8,037,453 B1* | 10/2011 | Zawadzki | G06F 8/71 | 717/107 |
| 8,122,436 B2* | 2/2012 | Costa | G06F 11/0748 | 712/223 |
| 8,166,462 B2* | 4/2012 | Kosche | G06F 11/328 | 717/125 |
| 8,302,072 B2* | 10/2012 | Chandhoke | G06F 8/34 | 715/763 |
| 8,359,582 B2* | 1/2013 | Elliott | G06F 8/443 | 717/127 |
| 8,370,812 B2* | 2/2013 | Feblowitz | G08G 1/04 | 717/105 |
| 8,468,502 B2* | 6/2013 | Lui | G06F 11/3612 | 717/125 |
| 8,473,899 B2* | 6/2013 | Centonze | G06F 8/4434 | 704/9 |
| 8,499,286 B2* | 7/2013 | Lawrance | G06F 11/3672 | 379/10.01 |
| 8,510,709 B2* | 8/2013 | Bordelon | G06F 8/452 | 717/105 |
| 8,627,287 B2* | 1/2014 | Fanning | G06F 8/75 | 717/124 |
| 8,739,128 B1* | 5/2014 | Cohen | G06F 11/3672 | 717/124 |
| 8,893,087 B2* | 11/2014 | Maddela | G06F 8/70 | 714/745 |
| 2002/0123984 A1* | 9/2002 | Prakash | G06F 8/34 | |
| 2002/0129333 A1* | 9/2002 | Chandhoke | G06F 8/34 | 717/107 |
| 2003/0001854 A1* | 1/2003 | Jade | G06F 9/4448 | 345/581 |
| 2003/0090453 A1* | 5/2003 | Fischer | G06F 9/4448 | 345/100 |
| 2003/0126559 A1* | 7/2003 | Fuhrmann | G06F 17/28 | 715/229 |
| 2004/0046787 A1* | 3/2004 | Henry | G06F 8/38 | 715/744 |
| 2004/0056894 A1* | 3/2004 | Zaika | G06F 9/4448 | 715/762 |
| 2004/0158451 A1* | 8/2004 | Mussini | G06F 9/4448 | 704/2 |
| 2004/0205713 A1* | 10/2004 | Keim | G06F 8/38 | 717/118 |
| 2006/0150149 A1* | 7/2006 | Chandhoke | G06F 8/34 | 717/109 |
| 2006/0173840 A1* | 8/2006 | Shaath | G06F 9/4448 | |
| 2006/0253834 A1* | 11/2006 | Cacenco | G06F 8/34 | 717/107 |
| 2008/0222190 A1* | 9/2008 | Kosaka | G06F 9/4448 | |
| 2008/0250398 A1* | 10/2008 | Takahashi | G06F 9/4448 | 717/147 |
| 2010/0042972 A1* | 2/2010 | Cacenco | G06F 8/34 | 717/106 |
| 2011/0119605 A1* | 5/2011 | Jayadevan | G06F 8/38 | 715/763 |
| 2013/0055147 A1* | 2/2013 | Vasudev | G06F 8/38 | 715/781 |
| 2014/0258971 A1* | 9/2014 | Jayadevan | G06F 8/38 | 717/105 |
| 2016/0034436 A1* | 2/2016 | Peterson | G06F 17/273 | 715/256 |

OTHER PUBLICATIONS

Wikipedia, online encyclopedia, "XPath", Definition from Wikipedia.org. Retrieved Mar. 17, 2015 from http://en.wikipedia.or/wiki/XPath . 9 pp.

Markus, "Why is WYSIWYG important for software localization?", *The Localization Tool*, Apr. 24, 2007 [Online] retrieved Mar. 3, 2015 from http://www.the-localization-tool.com/why-is-wysiwyg-important-for-software-localizaton/ , 7 pp.

Kumar, Ravikant, "Globalization, Internationalization (I18N), and Localization using C# and .NET 2.0", *Code Project*, Bangalore India, Nov. 2, 2009 [Online] retrieved Mar. 15, 2015 from http://www.codeproject.com/Articles/43360/Globalization-Internationalization-I-N-and-Localization.com , 9 pp.

"Walkthrough: Using Resources for Localization with ASP.NET", Microsoft Developer Network, [Online] retrieved Mar. 14, 2015 from https://msdn.microsoft.com/en-us/library/fw69ke6f(v=vs.140).aspx , 5 pp.

"How to: Create a Localized Version of a Resource File", Microsoft Virtual Studio 2010, [Online] retrieved Mar. 14, 2015 from https://msdn.microsoft.com/en-us/library/vstudio/aa992030(v=vs.100).aspx , 1 pp.

Localization Seminar—Professional Development for Translators & Interpreters, American Translators Association, An ATA Professional Development Event; Renaissance Seattle Hotel, Aug. 23-24, 2008, Seattle, Washington, [Online] retrieved Mar. 3, 2015 from http://www.atanet.org/pd/localization/abstracts.htm , 3 pp.

\* cited by examiner

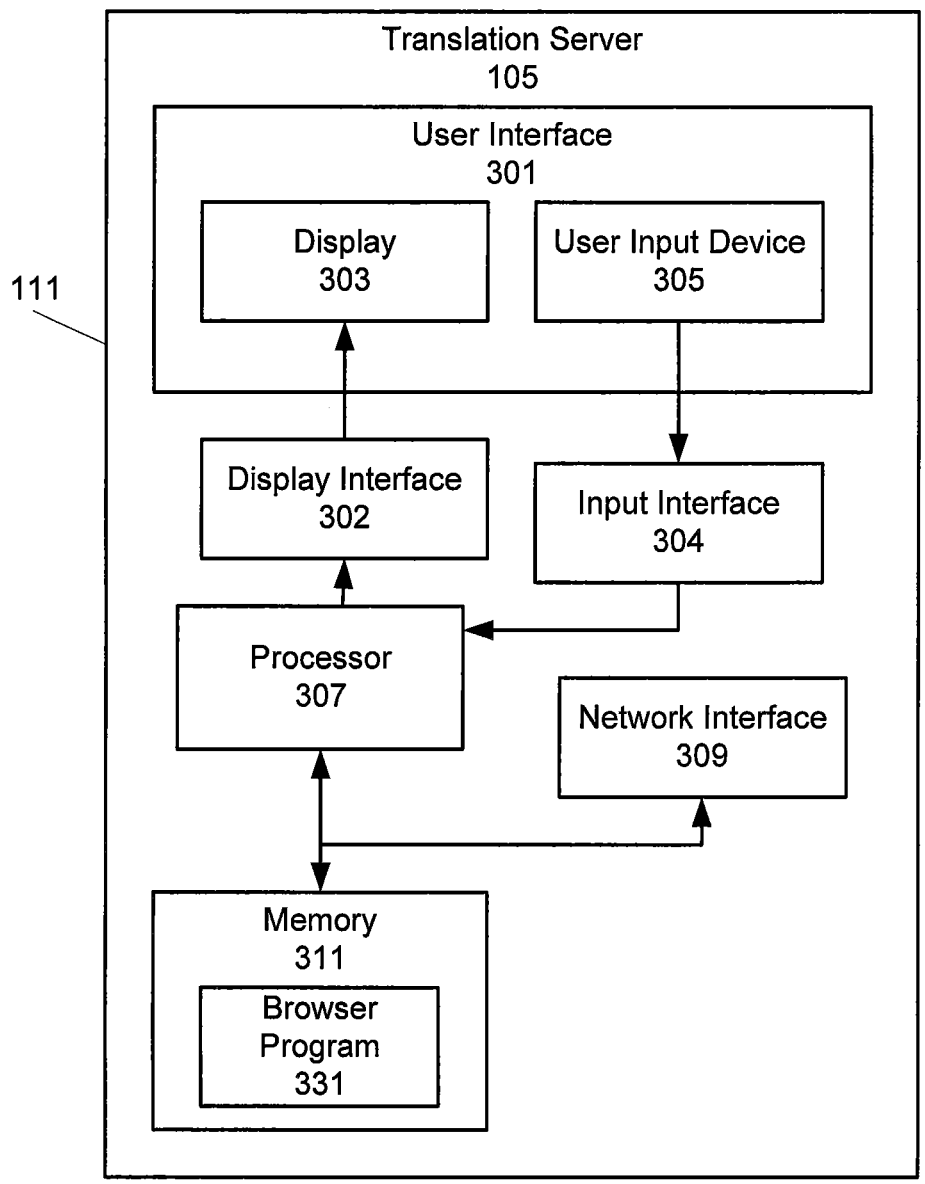

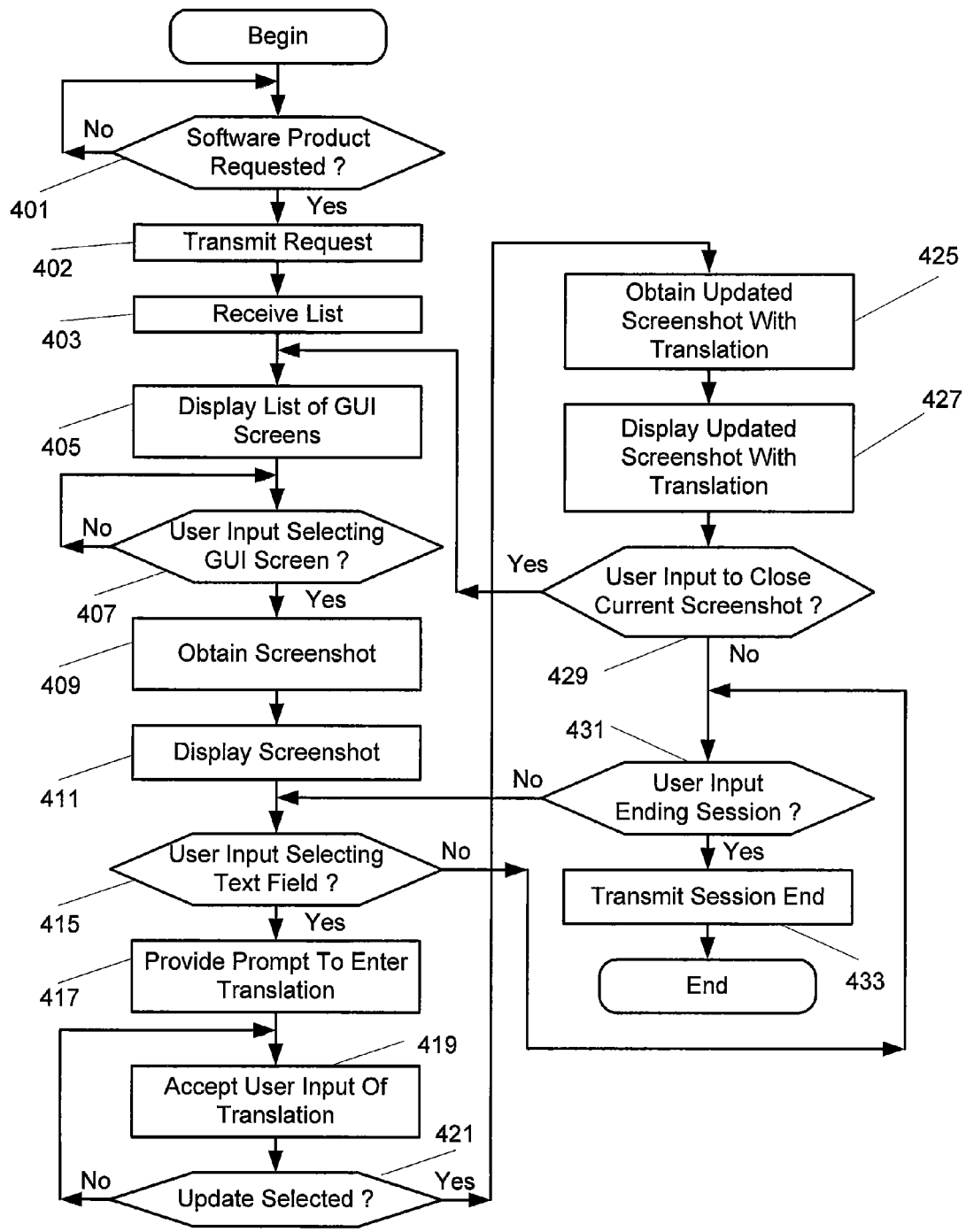

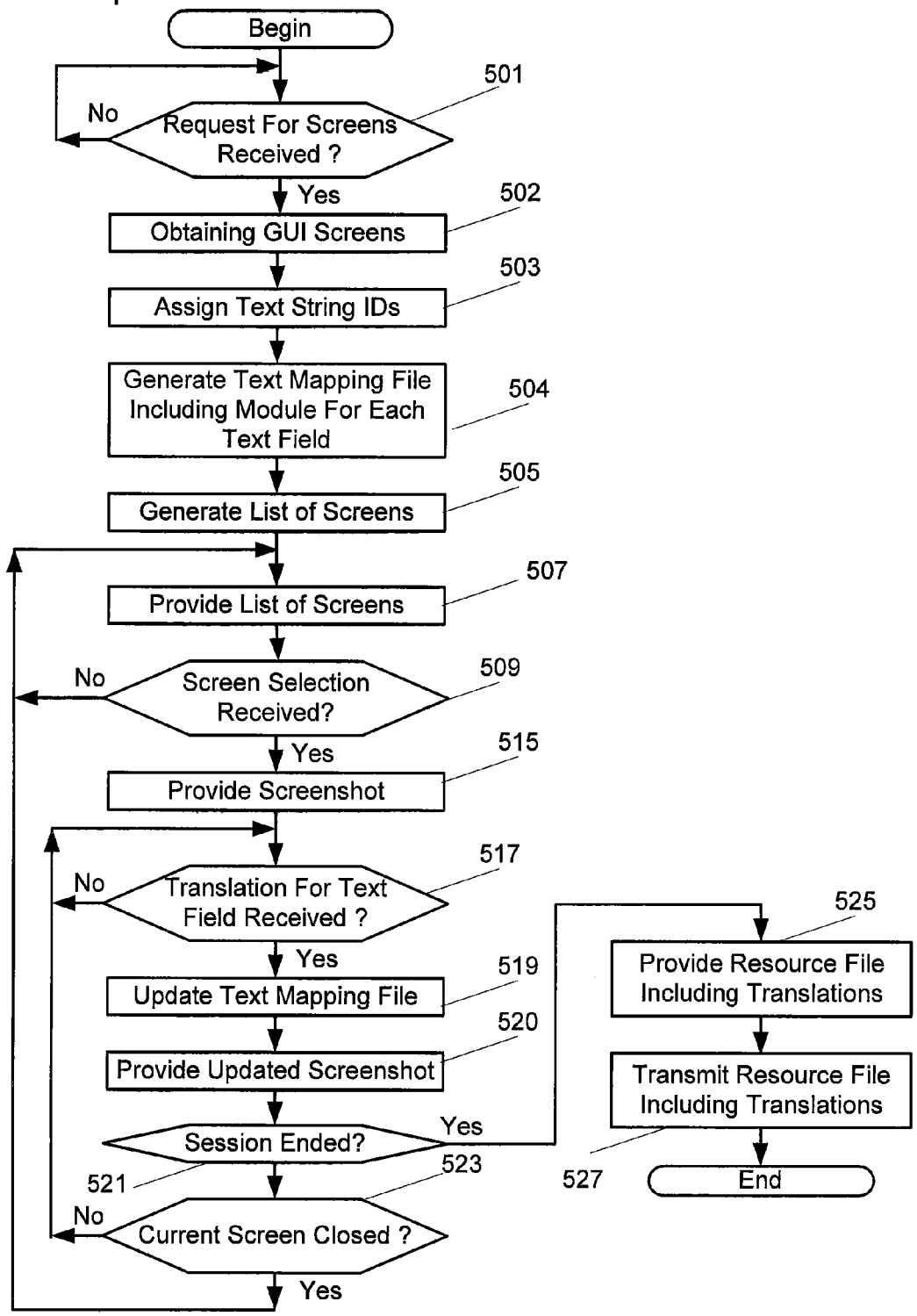

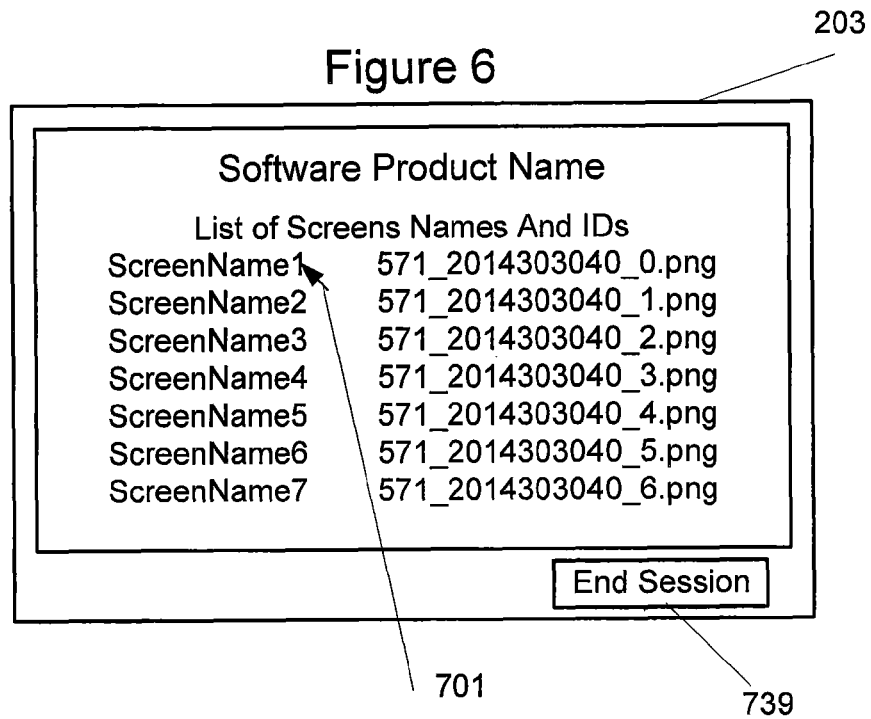
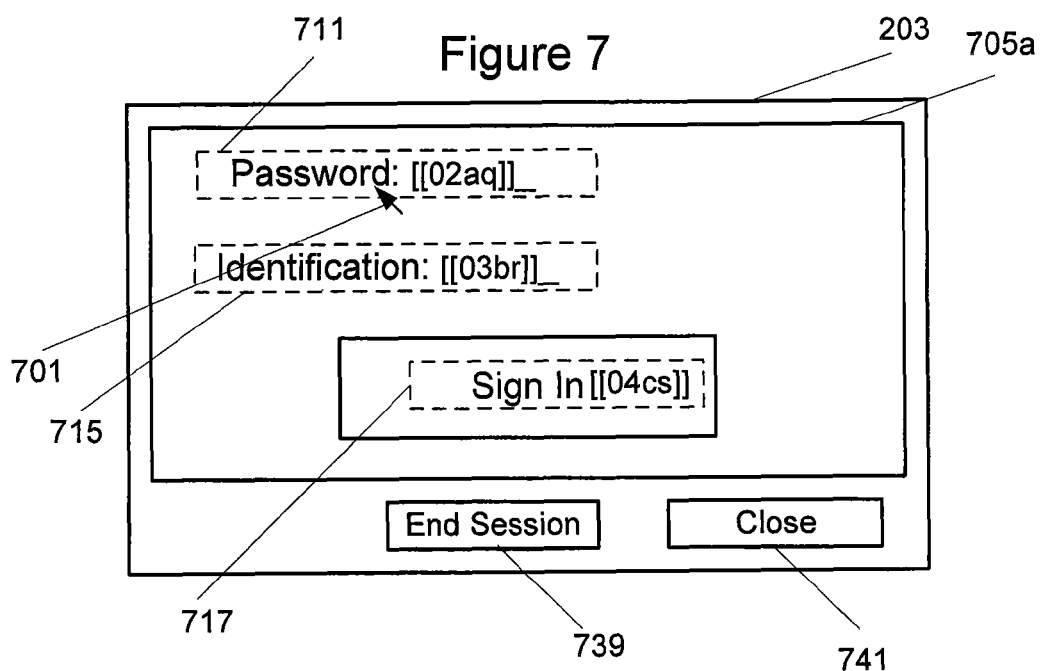

Figure 8A

Screen ID: 571_2014303040_0.png

Text: "Password [[02aq]]"

Coordinate: (30, 43)

Dimension: (197, 39)

Figure 8B

Screen ID: 571_2014303040_0.png

Text: "Identification [[03br]]"

Coordinate: (163. 43)

Dimension: (207, 39)

Figure 8C

Screen ID: 571_2014303040_0.png

Text: "Sign In [[04cs]]"

Coordinate: (1402. 63)

Dimension: (197, 39)

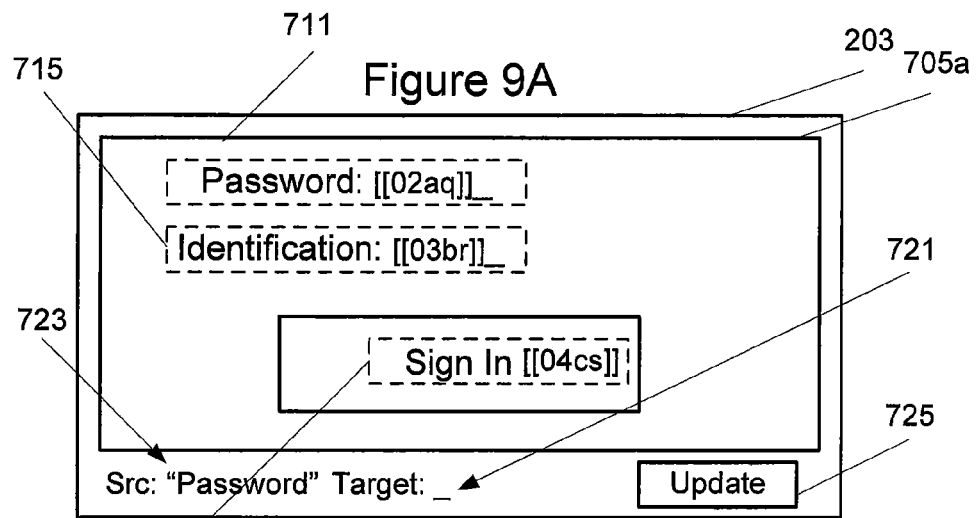
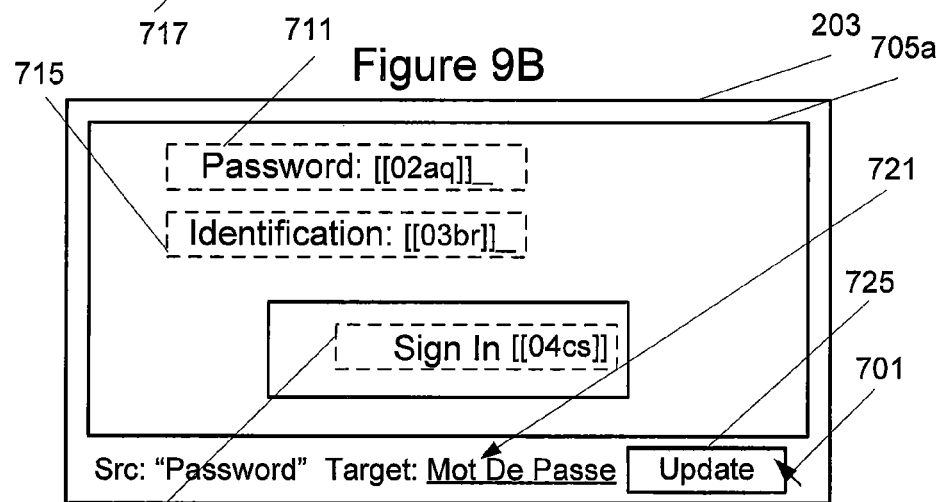
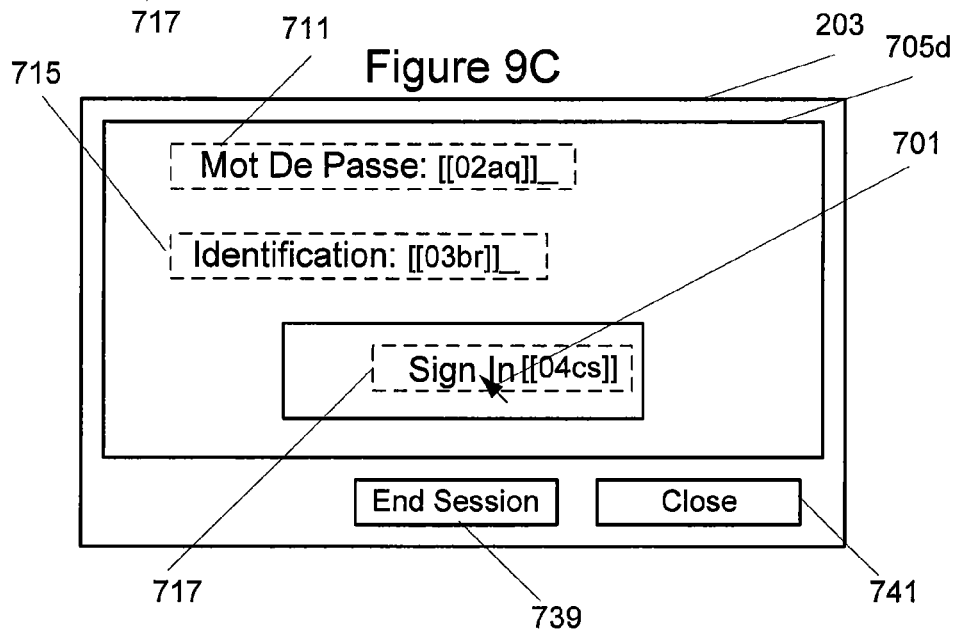

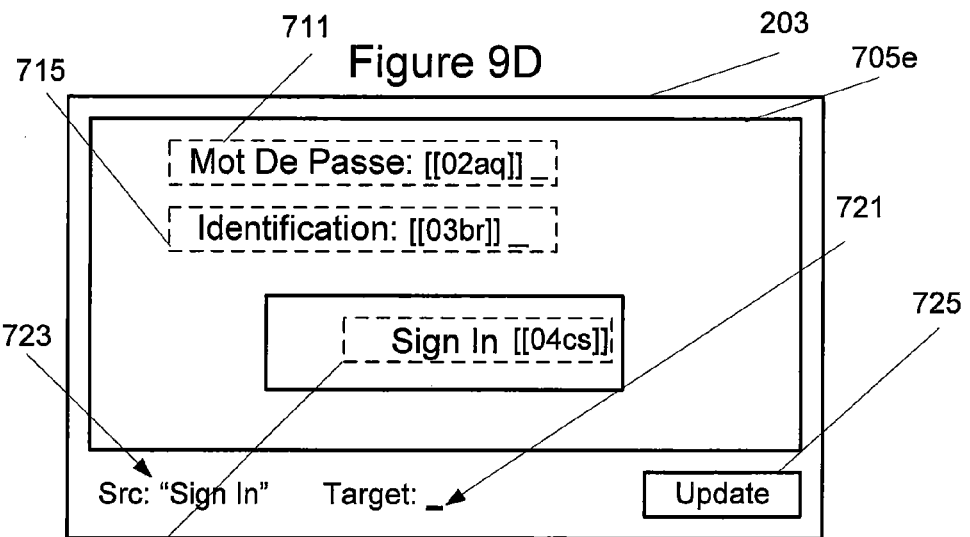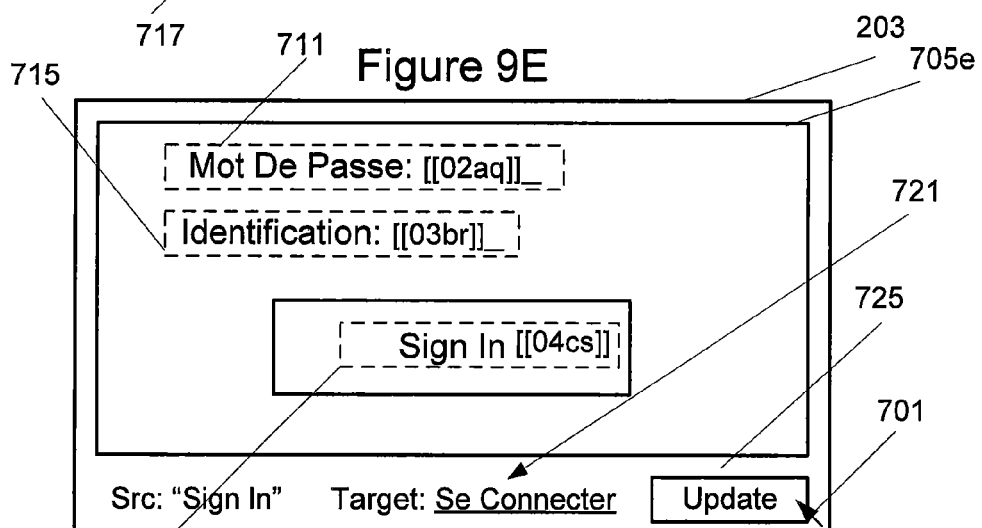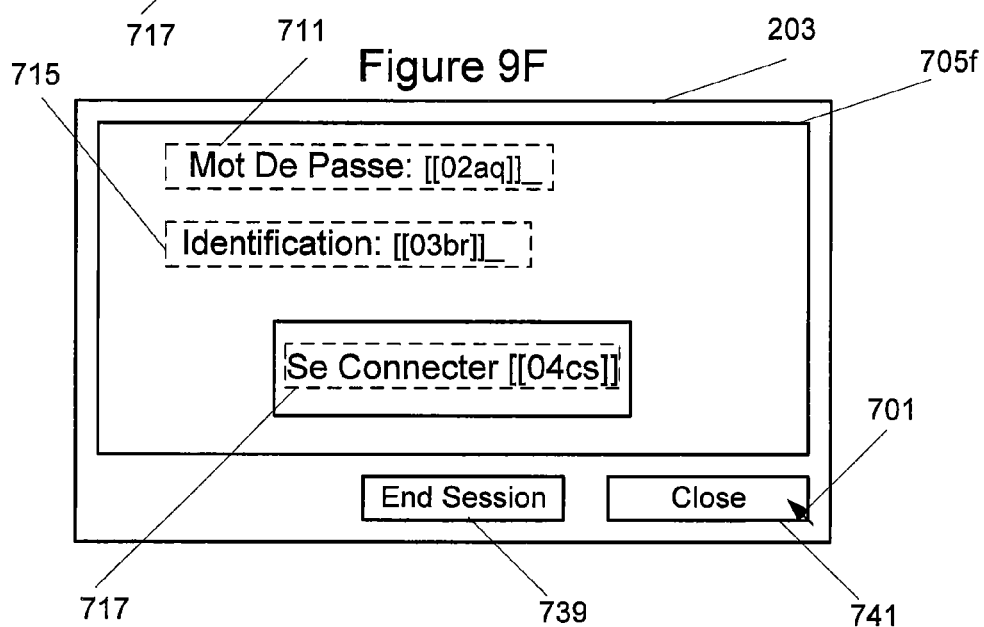

Figure 10A

Screen ID: 571_2014303040_0.png

Text: "Mot De Passe [[02aq]]"

Coordinate: (30, 43)

Dimension: (197, 39)

Figure 10B

Screen ID: 571_2014303040_0.png

Text: "Se Connecter [[04cs]]"

Coordinate: (1402. 63)

Dimension: (197, 39)

EDITING SOFTWARE PRODUCTS USING TEXT MAPPING FILES

BACKGROUND

The present disclosure relates to computer methods and systems, and more specifically, to methods of translating text of Graphical User Interface (GUI) screens and related computer program products and systems.

A software product may be developed in a first language (e.g., English), and then translated into a second language for use/sale in another country. The development of a version of the software product for a second language may be referred to as a localization build, and the version of the software product for the second language may be referred to as a localization version of the software product. For each Graphical User Interface (GUI) screen, fields may be provided for text strings, and the text strings of the first language used to populate these text fields of the GUI screens for the software product may be separately provided in a first resource file for the first language. Other resource files may thus be provided with text strings in other languages to provide localization versions of the software product in other languages using the GUI screens.

Currently, translators (also referred to as linguists) may translate individual text strings of the first resource file for the software product to a second language using a text editor without knowing where/how the text strings appear in real GUI screens of the software product. Without knowing the context of the text strings in GUI screens of the software product, however, a quality of the translation may be relatively low.

To provide a sufficient quality of translation, the build development cycle for a localization version of a software product may be complicated. For example, a linguist may translate the text strings from the first language to the second language, and then the software developer may make a first localization version of the software product in the second language using the text string translations provided by the linguist. A Quality Assurance (QA) function may then generate GUI screens of the software product from the first localization version and provide these screenshots to the linguist. Using these GUI screens, the linguist can check the quality of the translation in the context of the GUI screens and provide corrections/revisions using the text editor. The software developer can revise the localization versions of the software product based on these corrections/revisions, and the Quality Assurance (QA) function can verify the new translation delays in the product GUIs of the localization build of the software product.

This multi-step process of translation, however, may be complicated, and/or may increase time/delay to provide a localization build of a software product.

BRIEF SUMMARY

According to one aspect of the present disclosure, a method supporting editing of a software product may include obtaining a graphical user interface (GUI) screen for the software product, wherein the GUI screen includes a plurality of text fields, and wherein a first resource file includes text strings for respective ones of the text fields. A text mapping file may be generated for the software product, wherein the text mapping file includes a module for each text string of the first resource file, and wherein the module for each text string includes a text string from the resource file and a unique text string identification for the text string. A first screenshot of the GUI screen may be provided for display wherein the first screenshot includes a first text field with an original first text string for the GUI screen from a respective first module of the text mapping file and a second text field with an original second text string for the GUI screen from a respective second module of the text mapping file. User input of a new first text string may be received for the first text field. Responsive to receiving user input of the new first text string, the first module of the text mapping file may be updated to replace the original first text string of the first text field for the GUI screen with the new first text string of the first text field for the GUI screen. Responsive to receiving user input of the new first text string, a second screenshot of the GUI screen may be provided for display wherein the second screenshot includes the first text field with the new first text string from first module of the text mapping file and the second text field with the original second text string for the GUI screen from the second module of the text mapping file. A second resource file may be provided including the new first text string for the first text field of the GUI screen.

According to still another aspect of the present disclosure, a translation server may include a processor circuit. The processor circuit may be to obtain a graphical user interface screen for a software product, wherein the GUI screen includes a plurality of text fields, and wherein a first resource file includes text strings for respective ones of the text fields. The processor circuit may be to generate a text mapping file for the software product, wherein the text mapping file includes a module for each text string of the first resource file, wherein the module for each text string includes a text string from the resource file and a unique text string identification for the text string. The processor circuit may be to provide a first screenshot of the GUI screen for display wherein the first screenshot includes a first text field with an original first text string for the GUI screen from a respective first module of the text mapping file and a second text field with an original second text string for the GUI screen from a respective second module of the text mapping file. The processor circuit may be to receive user input of a new first text string for the first text field. The processor circuit may be to update the first module of the text mapping file to replace the original first text string of the first text field for the GUI screen with the new first text string of the first text field for the GUI screen responsive to receiving user input of the new first text string. The processor circuit may be to provide a second screenshot of the GUI screen for display wherein the second screenshot includes the first text field with the new first text string from first module of the text mapping file and the second text field with the original second text string for the GUI screen from the second module of the text mapping file responsive to receiving user input of the new first text string. The processor circuit may be to generate a second resource file including the new first text string for the first text field of the GUI screen.

According to still another aspect of the present disclosure, a computer program product may support editing of a software product, and the computer program product may include a computer readable storage medium comprising computer readable program code embodied therein. The computer readable program code may include computer readable program code to obtain graphical user interface (GUI) screen for the software product, wherein the GUI screen includes a plurality of text fields, and wherein a first resource file includes text strings for respective ones of the text fields. The computer readable program code may include computer readable program code to generate a text mapping file for the software product, wherein the text mapping file includes a module for each text string of the first resource file, wherein the module for each text string includes a text string from the resource file and a unique text string identification for the text string. The computer readable program code may include computer readable program code to provide a first screenshot of the GUI screen wherein the first screenshot includes a first text field with an original first text string for the GUI screen from a respective first module of the text mapping file and a second text field with an original second text string for the GUI screen from a respective second module of the text mapping file. The computer readable program code may include computer readable program code to receive user input of a new first text string for the first text field. The computer readable program code may include computer readable program code to update the first module of the text mapping file to replace the original first text string of the first text field for the GUI screen with the new first text string of the first text field for the GUI screen; responsive to receiving user input of the new first text string. The computer readable program code may include computer readable program code to provide a second screenshot of the GUI screen for display wherein the second screenshot includes the first text field with the new first text string from first module of the text mapping file and the second text field with the original second text string for the GUI screen from the second module of the text mapping file responsive to receiving user input of the new first text string. The computer readable program code may include computer readable program code to provide a second resource file including the new first text string for the first text field of the GUI screen.

BRIEF DESCRIPTION OF THE DRAWINGS

Aspects of the present disclosure are illustrated by way of example and are not limited by the accompanying figures with like references indicating like elements.

FIG. 3 is a block diagram illustrating a translation server of FIG. 1 according to some embodiments of inventive concepts;

FIG. 4 is flow chart illustrating operations of an editor workstation of FIGS. 1 and 2 according to some embodiments of inventive concepts;

FIG. 5 is a flow chart illustrating operations of a translation server of FIGS. 1 and 3 according to some embodiments of inventive concepts;

FIG. 6 is a screenshot of a display of screen names for graphical user interface screens of a software product at an editor workstation of FIGS. 1 and 2 according to some embodiments of inventive concepts;

FIG. 7 is a screenshot of a software product screen at an editor workstation of FIGS. 1 and 2 according to some embodiments of inventive concepts;

FIGS. 8A, 8B, and 8C illustrate text mapping files for text fields of the screenshot of FIG. 7 according to some embodiments of inventive concepts;

FIGS. 9A, 9B, 9C, 9D, 9E, and 9F are screenshots illustrating operations of translating text strings of the software product screen of FIG. 7 at an editor workstation according to some embodiments of inventive concepts; and FIGS. 10A and 10B illustrate new text mapping files for translations of text fields of the software product screen of FIG. 7 according to some embodiments of inventive concepts.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

Current techniques to translate GUI screens of a software product may be inefficient, in part because, the linguist may be unable to see the real product graphical user interface when translating individual text strings. Efficiency may be improved, as discussed in greater detail below, by providing editing from product screens thereby improving a quality of translations and/or efficiency of providing a localization build of a software product.

According to some embodiments disclosed herein, screenshots of graphical user interface (GUI) screens of a software product may be provided through an editor workstation to a translator (also referred to as a linguist or a user of the editor workstation) in substantially real-time as translations are entered so that all text strings of a GUI screen in the first language are provided to the translator at the same time and in the context of the particular screen, and so that translations of particular text strings are shown in the context of the particular screen as the text string translations are entered. By providing the context of each GUI screen and all text strings therein, the translator may provide a higher quality of translation of each GUI screen. According to some embodiments, a translation of each text string may be provided on the GUI screen as the translation is entered (and before a translation of another string on the same GUI screen is entered). By providing the translations in actual GUI screenshots as the translator enters translations of each text field, the translator can more efficiently correct/improve translations as needed (without waiting for someone else to enter the translations and generate screenshots after entering all revisions).

Figure 1:
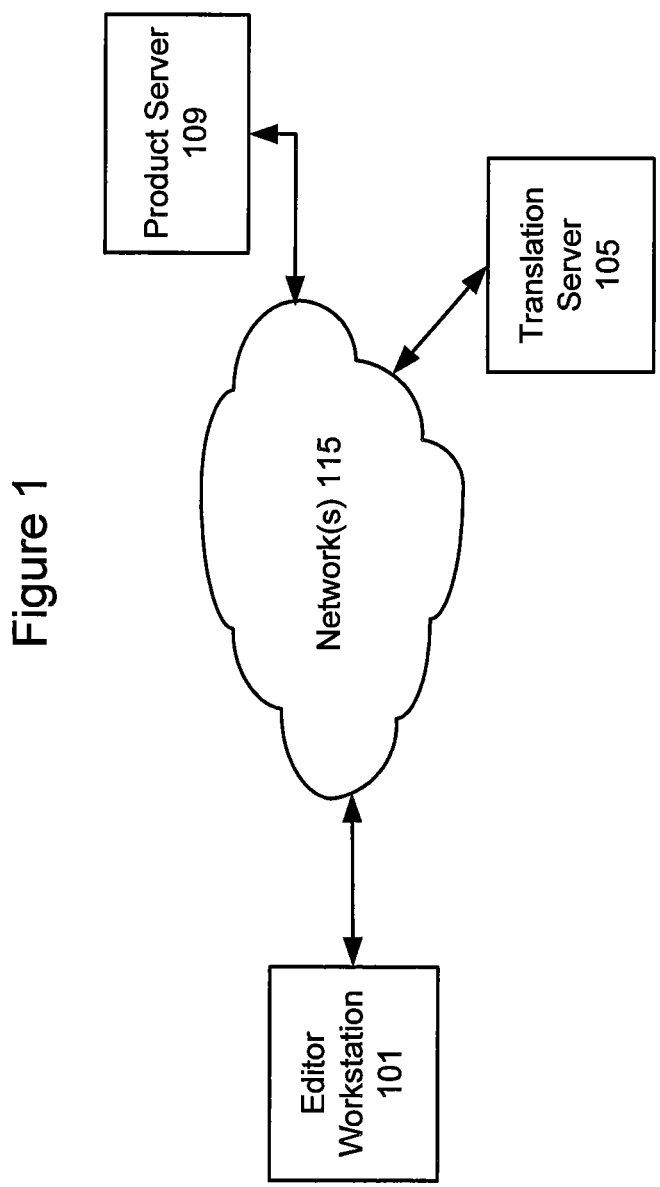
FIG. 1 is a schematic diagram illustrating an editor workstation, a translation server, and a product server coupled over a network(s) according to some embodiments of inventive concepts.

FIG. 1 is a schematic diagram illustrating editor workstation 101, product server 109, and translation server 105, all coupled through a network 115. As discussed according to some embodiments, editor workstation 101 and translation server 105 may be remote (e.g., provided in different machines and/or at different locations). According to other embodiments, however, functionalities of editor work station 101 and translation server 105 may be co-located (e.g., provided in a same machine and/or at a same location). Translation server 105 may run a browser program to obtain product GUI screens from product server 109 over network 115, and browser program may display screenshots of GUI screens at editor workstation 101. Translation server 105 may thus be the host of the web browser program that may be used to open an instance to obtain product GUI screens from product server 109.

Figure 2:
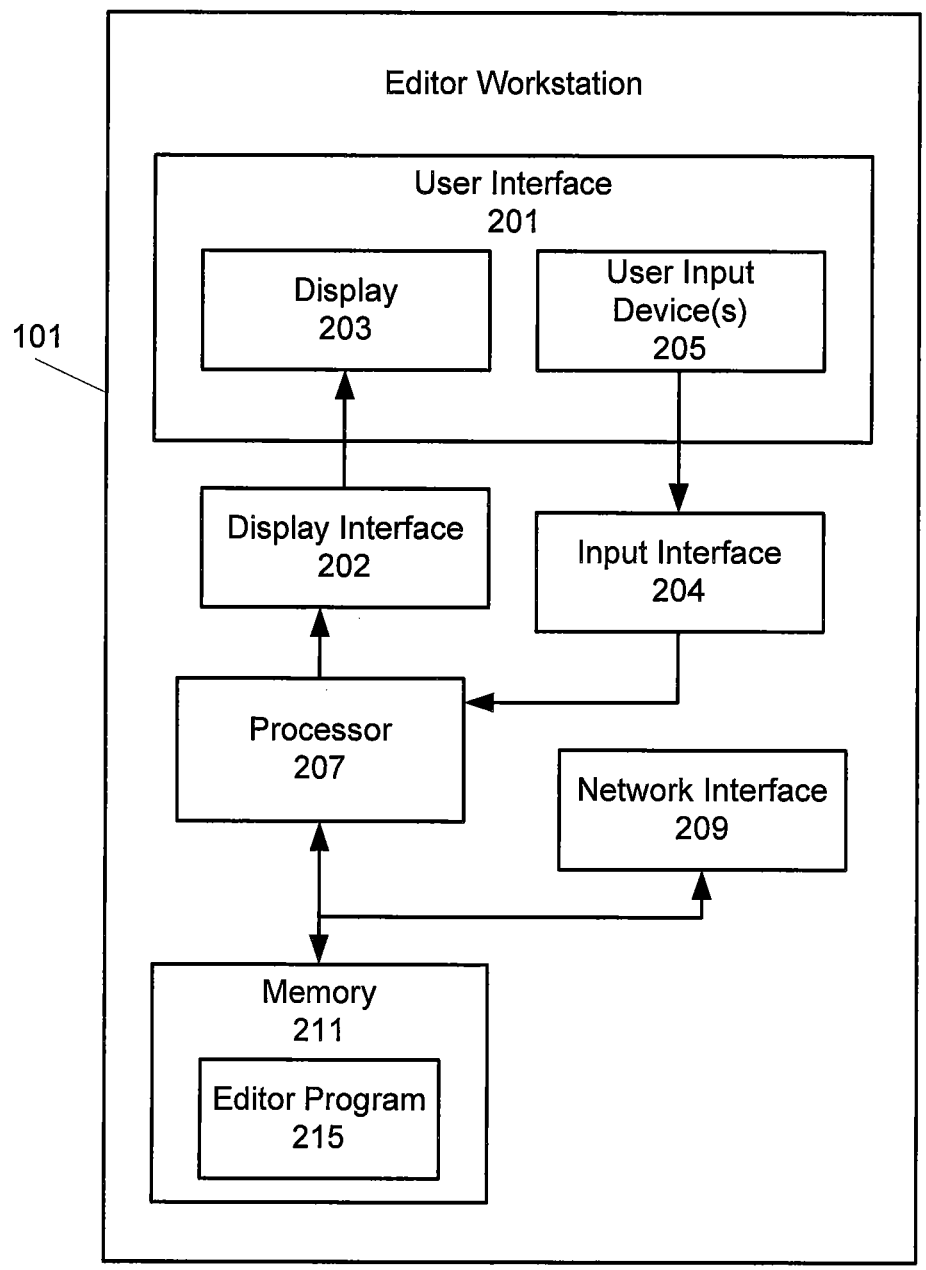
FIG. 2 is a block diagram illustrating an editor workstation of FIG. 1 according to some embodiments of inventive concepts.

FIG. 2 is a block diagram illustrating editor workstation 101 used to run editor program 215 according to some embodiments of inventive concepts. As shown in FIG. 2, editor work station 101 may include processor 207, memory 211, network interface 209 (providing communication over network(s) 115), input interface 204 providing communication with user input device(s) 205, and display interface 202 providing communication with display 203. As shown, user interface 201 may include display 203 and user input device(s) 205, but one or both of these elements (or portions thereof) may be external to editor workstation 101 and/or integrated in editor workstation 101. Processor 207, memory 211, and interfaces 202, 204, and 209 may be connected via a bus or busses. Moreover, editor program 215 may be stored in memory 211 to support translation of software products into different languages. Operations of editor workstation 101 are discussed below with respect to the flow chart of FIG. 4.

FIG. 3 is a block diagram illustrating translation server 105 used to support editor workstation 101 according to some embodiments of inventive concepts. As shown in FIG. 3, translation server 105 may include processor 307, memory 311, network interface 309 (providing communication over network(s) 115), input interface 304 providing communication with user input device(s) 305, and display interface 302 providing communication with display 303. As shown, user interface 301 may include display 303 and user input device(s) 305, but one or both of these elements (or portions thereof) may be external to translation server and/or integrated in translation server 105. According to other embodiments, user interface 301, display 303, user input device 305, input interface 304, and/or display interface 302 may be omitted from translation server 105. Processor 307, memory 311, and interfaces 302, 304, and 309 may be connected via a bus or busses. Moreover, browser program 331 may be stored in memory 311 to support translation of software products into different languages.

As further shown in FIG. 1, editor workstation 101, translation server 105, and product server 109 may be coupled through one or more networks 115 (e.g., including one or more of a local area network LAN, a wire area network WAN, the Internet, etc.). Moreover, a network(s) between editor workstation 101 and translation server 105 may be the same as or different than a network(s) between translation server 105 and product server 109.

Translation server 105 (also referred to as a translation bot server or a translation bot) may work closely with editor workstation 101 and product server 109. Translation server 105 can open multiple browsers in a remote machine/machines (e.g., multiple browsers in remote product server 109 to access multiple product GUI screens of a software product). Translation server 105 may operate using an XML driven application, and web browsers may provide access to product GUI screens using instructions in an XML file. Such an XML file may be used to define project metadata used by translation server 105 and editor workstation 101, and to drive translation server 105 to retrieve GUI screens of a software product from product server 109.

Editor workstation 101 may be used by the translator (also referred to as a linguist, an editor workstation user, or a user) as an interface to translate GUI screens of a software product by invoking the translation server 105 to capture all GUI screens of the software product from product server 109. Responsive to translator/user input requesting a software product at block 401 of FIG. 4, processor 207 may transmit a request to translation server 105 to initiate translation of an identified software product at block 402, and at block 403, processor 207 may receive a list of GUI screens of the software product at block 403. At block 405, processor 207 may display the list of screens on display 203 (as shown in FIG. 6) at block 405. Responsive to user selection at block 407 (e.g., using a pointer device such as a computer mouse), editor workstation processor 207 may display a screenshot of the selected GUI screen from translation server 105 at block 409 to be used by the translator/user to enter translations of text strings included therein. The translator/user can open screenshots of each GUI screen for display at editor workstation 101, and while a selected screenshot of a GUI screen is displayed at editor workstation 101, the translator/user can translate each text string on the screenshot of the selected GUI screen at blocks 415-431. After translation of each text string, the screenshot of the selected GUI screen may be updated for the translator/user using the respective translation (also referred to as localization string) of the original text string/strings.

Editor workstation 101 may display a list of GUI screens (see FIG. 6) providing a screen name for each GUI screen of the software product, and the list may be used by the translator/user to navigate to the different GUI screens of the software product. For example, a pointing device (such as a computer mouse) may be used to control a pointer 701 to "click" on a screen name to select the respective GUI screen. A screenshot 705a of the selected GUI screen may then be displayed at the editor workstation 101 as shown in FIG. 7, and the translator/user can use the pointer 701 to select (e.g., "click" on) a text string on the GUI screen for translation. Each text string, for example, may be provided within a respective area (e.g., within a rectangle of pixels), and a click within that area using pointer 701 may select the respective text string (e.g., "Password" in FIG. 7). When a text string is selected from the screenshot, editor workstation 101 may display the selected text string in a source field "Src:" 723 while continuing to display the screenshot 705a of the selected GUI screen, and a "target" field 721 may be provided to accept entry of the translation of the text string as shown in FIG. 9A. Responsive to the translator/user selecting ("clicking" on) an Update button 725 after entering the translation (e.g., "Mot De Passe" in FIG. 9B) into the target field 721 as shown in FIG. 9B, editor workstation 101 may provide the translation of the text string to the translation server 105. The translation server 105 may respond by providing the updated screenshot 705d of the selected GUI screen with the translation (e.g., "Mot De Passe") provided in the respective text field 711, and editor workstation 101 can then display the screen with the translated text field as shown in FIG. 9C.

As shown in FIG. 7, an initial screenshot 705a (corresponding to a respective GUI screen of the software product, e.g., "ScreenName1" with Screen ID 517_2014303040_0.png) may be provided on display 203 responsive to the selecting "ScreenName1" from the list of FIG. 6, for example, using pointer 701 controlled by a pointing device (e.g., a computer mouse, touch pad, touch screen, etc.) to move pointer 701 to "ScreenName1" and click. In the example screen of FIG. 7, a screenshot of a Login GUI screen 705a may be provided by translation server 105 on display 203 of editor workstation 101, and the Login screenshot may include a Password prompt text field 711 (including the English text string "Password"), an Identification prompt text field 715 (including the English text "Identification"), and a Sign In button text field 717 (including the English text "Sign In"). As discussed in greater detail below, a respective text string identification may also be appended to each text string as displayed in the screenshot 705a, and the screenshot may be provided by translation server 105 using a text mapping file including modules for respect text fields (as shown for example in FIGS. 8A, 8B, and 8C). The screenshot 705a on editor workstation display 203 in FIG. 7 may be non-functional regarding actual login, but may instead be provided to allow translation of the text strings in respective text fields.

As indicated with dotted lines (that may be omitted in the actual screenshot), each text field 711, 715, and 717 may be defined for a respective area (e.g., a rectangle) of the screenshot within which pointer 701 (e.g., controlled using a pointer device such as a computer mouse) can be used to select the respective text field. More particularly, each text field may be defined by a respective module of a text mapping file generated by translation server 105. FIG. 8A illustrates a text mapping file module for the text string "Password" of text field 711, and the text mapping file module may include the product GUI screen identification (571_2014303040_0.png), the text string ("Password"), a unique text string identification ("02aq"), and information (e.g., coordinate and dimension information) defining an area of the GUI screen for the text field. FIG. 8B illustrates a text mapping file module for the text string "Identification" of text field 715, and the text mapping file module may include the product screen identification (571_2014303040_0.png), the text string ("Identification"), a unique text string identification ("03br"), and information (e.g., coordinate and dimension information) defining an area of the screen for the text field. FIG. 8C illustrates a text mapping file module for the text string "Sign In" of text field 717, and the text mapping file module may include the product screen identification (571_2014303040_0.png), the text string ("Sign In"), a unique text string identification ("04cs"), and information (e.g., coordinate and dimension information) defining an area of the GUI screen for the text field. In each module of the text mapping file for the software product, the coordinate may define a coordinate of screenshot (e.g., a pixel coordinate) for a top left corner of the respective text field, and the dimension may define a height and width of the respective text field (e.g., rows and columns of pixels). Stated in other words, the coordinate may define a location of the text field, and the dimension may define a size of the text field.

As further shown, the screenshot that is provided to the translator/user on display 203 may include the text strings in the respective text fields with the respective unique text string identifications appended thereto. This is different than the respective product GUI screens where only the text strings would be provided.

In text mapping file modules according to some embodiments of inventive concepts, the screen ID field identifies the GUI screen to which the text mapping file module belongs, the text field provides the text string and a respective unique text string identification of the text field, and the coordinate/dimension information defines a location/size of the text field on the screen. Each text mapping file module can thus be used to specifically identify each text string/field using the respective unique text string identification, even if the same text is used in different text fields of the same GUI screen or different GUI screens of the software product. Accordingly, a unique translation may be provided for each text field, even when two text fields of the original text mapping file include the same text string in the first language. When performing a translation, for example, the same word/phrase in one language may have different translations in another language depending on the context of use.

The "Text" field of a text mapping file module may initially identify the English text string before translation, but after translation of the text string, the "Text" field may identify the text string of the translation. Editor program 215 of editor workstation 101 may run only as a pseudo product server, so when mapping text, editor program 215 may only be able to obtain the pseudo text strings from the text mapping file modules.

The "Coordinate" for each text mapping file module may define a top-left coordinate of the text field, which may be a rectangular area of the screen. Each text item (such as a label, text field, button, list, or image of a web page) may have its own area (e.g., a rectangle) on the screen (also referred to as a container). The "Dimension" for each text mapping file may define a size of the area of the text field (e.g., the height and width of a rectangular area). The coordinate and dimension information may be defined as pixel coordinates, as measurement coordinates, etc. When the translator wishes to translate one English string, the translator may click the area of the screen defined by the coordinate/dimension information of the text mapping file (indicated with dashed lines in FIG. 7) to select that English string, and responsive to that selection, editor workstation 101 may allow entry of the translation, e.g., by providing a prompt 721 for text entry as shown in FIG. 9A.

The initial build (in the first language, e.g., English) of the software product may be installed on product server 109, and the initial build of the software product may be available to translation server 105 over network(s) 115. Moreover, translation server 105 may access the software product at product server 109 using an XML metadata file as discussed above. An XML metadata file for a software product may allow translation server processor 307 to automatically capture each possible GUI screen (including each possible page, dropdown menu, text box, etc.) for which translation may be required.

Operations of translation server processor 307 are illustrated in the flow chart of FIG. 5. When translation of a software product is initiated at editor workstation 101, a request may be transmitted from editor workstation 101 to translation server 105 to obtain screenshots for the software product. Responsive to such a request at block 501 of FIG. 5, processor 307 of translation server 105 may run browser program 331 and request/obtain the GUI screens (also referred to as GUI product screens) and/or related information (such as a resource file, e.g., an i18n resource file, that includes all of the text strings for the GUI screens of the software product) from product server 109 at block 502. Upon receiving the GUI screens and resource file (i.e., a list of all text strings of the software product) for the software product, processor 307 may use the resource file to identify all text strings to be translated, and for each text string in the resource file, processor 307 may assign a unique text string identification (e.g. 02aq, 03br, and 04cs) at block 503. At block 504, processor 307 may generate a text mapping file including respective modules for the text strings of the software product, with each module of the text mapping file including the text string, the unique text string identification, the identification of the GUI screen, and the information defining the location of the text string. Processor 307 may use the information from the product server (e.g., GUI screens and resource file) to generate special screenshots for each GUI screen of the software product (e.g., as shown in FIG. 7) and to generate the text mapping file including respective modules for each text string of the resource file (e.g., as shown in FIGS. 8A-C). According to some embodiments, the screenshots may include the text identifications appended to the respective text strings as shown in FIG. 7, and the text mapping file modules may define areas of the respective screens for each text field where a pointer can be used to select the respective text string for translation.

At blocks 505, processor 307 may generate a list of GUI screens of the software product, and at block 507, processor 307 may provide the list of screens for display at editor workstation 101 (e.g., as shown in FIG. 6).

According to some embodiments, processor 307 of translation server 109 may obtain real-time software product GUI screens by accessing the software product through network interface 309 and network(s) 115 from product server 109. Responsive to user selection of a GUI screen (e.g., using the list of FIG. 6) at block 509, processor 307 may upload a screenshot of the requested GUI screens through network interface 309 and network(s) 115 to editor workstation 101 at block 515 (e.g., providing screenshot 705a of FIG. 7). According to some embodiments, processor 309 may obtain all software product GUI screens from product server 109 at block 502 responsive to an initiation request from editor workstation 101 at block 501, and then upload screenshots at block 515 to editor workstation 101 responsive to individual screen requests initiated from the list of FIG. 6 at block 509. According to some other embodiments, processor 309 may retrieve sufficient information about the software product screens to generate/upload the list of FIG. 6, but processor 309 may wait to obtain actual GUI screens from product server 109 responsive to individual screen requests initiated from the list of FIG. 6.

Once a screenshot has been uploaded to editor workstation 101 through network 115 and network interface 209 at block 515, processor 207 may provide the screen (through device interface 202) on display 203 as shown in FIG. 7, and the translator may use pointer (controlled using a user input device such as a computer mouse) to click on text fields to be translated. The translator may use pointer 701 to click on the "password" text field 711 as shown in FIG. 7, and as shown in FIG. 9A, processor 207/307 may provide a "Target" prompt 721 on screen 705b for entry of a translation. Processor 207/307 may accept user input (e.g., from a user input device such as a keyboard) of a translation ("Mot De Passe") at the prompt 721 as shown in FIG. 9B. The translator can then use pointer 701 to click on the "Update" button 725 to submit the translation, and the translation can be transmitted through network interface 209 and network(s) 215 to translation server 105.

Responsive to receiving the translation of the text string at block 517, processor 307 may update the text mapping file module for the text string at block 519 as shown, for example, in FIG. 10A. More particularly, the module for the text field 711 was originally provided as shown in FIG. 8A, and then updated at block 519 to include the translation as shown in FIG. 10A. While the text is revised from FIG. 8A to 10A ("Passoword" to "Mot De Passe"), the other elements (Screen ID, Coordinate, Dimension, and text string identification) of the module are unchanged. For example, the translation may be transmitted in a new text mapping file for the text field as shown, for example, in FIG. 10A. The original text mapping file module and the revised text mapping file module for the same text field may thus include the same screen identification, and the same text identification allowing processor 307 of translation server 105 to map the translation to the appropriate text field.

Processor 307 of translation server 105 may thus use the updated text mapping file (including the updated module) to provide (e.g., upload) an updated screenshot of the GUI screen with the translation (through network interface 309 and network(s) 115) to editor workstation 101. Processor 207 may receive the updated screenshot 705d (shown in FIG. 9C) through network 115 and network interface 209 and provide the updated screenshot (through display interface 202) on display 203 as shown in FIG. 9C. Accordingly, the translator can see the translation in the respective text field of the screenshot so that the translation is seen in the context of the screen in real time. As further shown in FIG. 9C, screenshots of a GUI product screen may show the screen during intermediate steps of translation (e.g., after translating text field 711 but before translating either of text fields 715 or 717).

Operations discussed above with respect to FIGS. 7 and 9A-C translating text field 711, may be repeated at blocks 517, 519, 520, 521, and 523 as shown in FIG. 9C-F for the same text field or for another text field 717. The "Close" button 741 of either FIG. 7, FIG. 9C, or FIG. 9F may be used to return to the screen list of FIG. 6 at block 523 to allow selection of another screen of the software product for translation.

When processor 307 of translation server 105 accesses a GUI screen of the software product at product server 109 (through network interface 309 and network(s) 115), processor 307 may capture the GUI screen and record all text strings of the screen and respective coordinate/dimension information in the text mapping file. This text mapping file, for example, may include a respective module for each text string/field of the software product as illustrated in FIGS. 8A-C. The text mapping file and the GUI screen can then be used to generate a screenshot this is uploaded to editor workstation 101. Editor workstation processor 207 may provide the screenshot on display 203 and the coordinate/dimension information associated with the text strings/fields may be used to identify text strings selected by the translator using pointer 701.

Operations of editor workstation 101 will now be discussed with reference to the flow chart of FIG. 4. Editor work station 101 may provide a remote interface to translation server 105 according to some embodiments, with screenshots being uploaded/received from translation server 105 over network 115 and with user input (e.g., screen/text selection using a pointer, and text/translation entry using a keyboard) being downloaded/transmitted to translation server 105 over network 115. According to other embodiments, operations of FIG. 4 may be performed at translation server 105.

A translator (also referred to as a user) may initiate operation of editor workstation 101 via input through an input user device 205, such as a keyboard and/or a pointing device (e.g., a computer mouse, a touch pad, a touch sensitive display, a track ball, etc.). For example, the translator may enter a name/identification of a software product using a keypad, and/or the translator may select a software product using a pointing device with a listing of software products on a GUI screen on display 203. Responsive to such user input requesting a software product at block 401, processor 207 may transmit a request for the software product for translation (through network interface 209 and network 115) at block 402 to translation server 105.

At block 403, processor 207 may receive the list of GUI screens for the software product (through network 115 and network interface 209) from translation server 105 (see block 507 of FIG. 5), and at block 405, processor 207 may provide the list of GUI screens (of the request software product) through display interface 202 to display 203. The list of GUI screens for the software product may be provided on display 203, for example, as shown in FIG. 6. As shown, a screen name and an identification may be provided on the list for each GUI screen of the software product, but either may be sufficient alone. From the list of FIG. 6, the translator can use pointer 701 to select a GUI screen for translation (by "clicking" on the desired screen name/ID) or to end the session (by "clicking" on the "End Session" button).

At block 407, processor 207 may wait for user selection of a GUI screen from the list of FIG. 6. Responsive to user input selecting a GUI screen at block 407, processor 207 may obtain a screenshot of the selected GUI screen from translation server 105 at block 409 (see block 515 of FIG. 5) and display the screenshot at block 411. As shown in FIG. 6, pointer 701 may be used to select "ScreenName1" at block 407, and the screenshot 705a of the selected GUI screen may be provided on display 203 at block 411 as shown in FIG. 7. In the example of FIG. 7, screenshot 705a may include three text fields 711, 715, and 717 for the text strings "Password," "Identification," and "Sign In".

As shown in Figure FIGS. 8A, 8B, and 8C, the text mapping file at translation server 105 may include three modules for the screenshot of FIG. 7. Because each of the text mapping files of FIGS. 8A-C relate to the same screenshot, each of these text mapping files includes the GUI screen identification (571_2014303040_0.png). The text mapping file module of FIG. 8A is provided for text field 711, and thus includes the text "Password", a text identification "02aq", and coordinate/dimension information defining an area of the screenshot for the text field 711. The text mapping file module of FIG. 8B is provided for text field 715, and thus includes the text "Identification", a text identification "03br", and coordinate/dimension information defining an area of the display for the text field 715. The text mapping file module of FIG. 8C is provided for text field 717, and thus includes the text "Sign In", a text identification "04cs", and coordinate/dimension information defining an area of the display for the text field 717. User input through editor workstation 101 can thus be used by translation server 105 to modify modules of the text mapping file for the selected GUI screen.

At block 415, processor 207 may accept user input through the input interface 204 from an input device to select text field 711 including the text "Password" of the selected product screen of FIG. 7. As shown in FIG. 7, pointer 701 (controlled by a pointing device) may be used by the translator to select text field 711 by clicking on the area of the display for text field 711 illustrated with dashed lines. Responsive to selection of text field 711 at block 415, processor 207/307 may provide a prompt (e.g., "Target" field) 721 to enter the translation (e.g., using translator input from a keyboard through input interface 204) at block 417 as shown in FIG. 9A. For example, a source field "Src:" 723 may provide the original/current text "Password" being translated, and a target field "Target:" 721 may provide a cursor prompt to enter the translation.

At block 419, processor 207/307 may accept user input of new text (e.g., a translation) for the first text field 711 through the input interface 204 from a user input device such as a keyboard. An example of such user input is illustrated in FIG. 9B where the translation (into French) "Mot De Passe" is entered into the target field 721. Once the translator finishes entering the desired text/translation, the translator may use pointer 701 to click on the "Update" button as shown in FIG. 9B. Responsive to the user input to update text field 711 with the new text at block 421, the text may be provided to translation server 105 where processor 307 may update the respective module of the text mapping file at block 519. As shown in FIG. 10A, for example, the module of the text mapping file may be modified to include the new text ("Mot De Passe") for text field 711 while maintaining the identification (571_2014303040_0.png) of the product screen, the identification ("02aq") of text field 711, and the coordinate/dimension information.

At block 425, processor 207 may receive an update of the screenshot with the translation from translation server 105 as shown in FIG. 9C (see operation 520 of FIG. 5). At block 427, processor 207 may provide the updated screenshot through display interface 202 to display 203 with the first text field 711 including the new text ("Mot De Passe") as shown in FIG. 9C. As shown in FIG. 9C, the updated screenshot 705d may be the same as the original screenshot 705a of FIG. 7 with the exception of the new text in text field 711. As further shown in FIGS. 7 and 9C, the same text string identification is appended to the original text of text field 711 in FIG. 7 and to the new text of text field 711 in FIG. 9A.

Once the screen has been updated with a translation of a text field as shown in FIG. 9C, the translator can use pointer 701 to: select a text field for translation at block 415/517, to select the "Close" button to close the current screen and return to the list of screens of FIG. 6 at block 429/523, or to select the "End Session" button to end the translation session at block 431/521. Responsive to user input to close the current screen (e.g., by clicking on the "Close' button) at block 429, processor 207 may return to block 405 to display the list of FIG. 6. If the current screen is not closed at block 429 and the session is not ended at block 431, processor may return to block 415 to continue translating the currently selected screen that now includes a modified text field as shown in FIG. 9C.

Responsive to not closing the current screen and not ending the session at blocks 429 and 431, processor 207/307 may accept user input selecting a new text field at block 415. As shown in FIG. 9C, the translator may use pointer 701 to select text field 717, and responsive to user input making this selection, processor 207/307 may provide a prompt 721 (such as a "Target:" field prompt and an input cursor) as shown in FIG. 9D. The Source field 723 "Src: Sign In" may identify the text to be translated, and the Target field 721 may provide a prompt to enter the translation. At block 419, processor 207/307 may accept user input through the input interface from the user input device (e.g., a keyboard) to accept user input of new text for the selected text field 717.

An example of such user input is illustrated in FIG. 9E where the translation (into French) "Se Connecter" is entered into the target field 721. Once the translator finishes entering the desired text/translation, the translator may use pointer 701 to click on the "Update" button as shown in FIG. 9E. Responsive to the user input to update text field 711 with the new text at block 421, the text may be provided to translation server 105 where processor 307 may update the respective module of the text mapping file at block 519. As shown in FIG. 10B, for example, the module of the text mapping file may be modified to include the new text ("Se Connecter") for text field 717 while maintaining the identification (571_2014303040_0.png) of the product screen, the identification ("04cs") of text field 717, and the coordinate/dimension information.

At block 425, processor 207 may obtain an update of the screenshot with the translation from translation server 105 as shown in FIG. 9F. At block 427, processor 207 may provide the screenshot through display interface 202 to display 203 with text field 717 including the new text as shown in FIG. 9E.

Once the screenshot has been updated with translations of text fields 711 and 717 as shown in FIG. 9F, the translator can use pointer 701 to: select a text field for translation at block 415; select the "Close" button at block 429 to close the current screen and return to the list of screens of FIG. 6; or select the "End Session" button 739 at block 431 to end the translation session. Responsive to user input to close the current screen (e.g., by clicking on the "Close' button) at block 429, processor 207 may return to block 405 to display the list of FIG. 6. If the current screen is not closed at block 429 and the session is not ended at block 431, processor may return to block 415 to continue translating the currently selected screenshot that now includes a modified text field as shown in FIG. 9C.

If the translator returns to the list of GUI screens of FIG. 6 at block 405, processor 207 may repeat operations of FIG. 4 for any number of screens of FIG. 6. As shown in FIG. 6, an "End Session" button 739 may be selected by the translator to end the session, and the session end may trigger notification to translation server 105 to generate a new resource file including the translated text strings from the session for transmission to product server 109 for use in a localization build of the software product in the second language. The session end may be triggered for example using the session end button of FIG. 6, FIG. 7, FIG. 9C, and/or FIG. 9E.

Operations of translation server 105 according to some embodiments will now be discussed with reference to the flow chart of FIG. 5. As discussed above, some or all of operations of FIG. 4 may also be performed by processor 307 of translation server 105, and/or a separate workstation editor 101 may be omitted entirely.

As discussed above, translation server 105 may be coupled with product server 109 and editor workstation 101 through one or more networks 115. Responsive to receiving a request for a software product from editor workstation 101 (through network(s) 115 and network interface 309) at block 501 (see block 402 of FIG. 4), processor 307 may obtain GUI screens for the software product at block 503, with each of the GUI screens being associated with a respective screen identification. For example, processor 307 may receive/ capture the product screens through network interface 309 and network(s) 115 from remote product server 109. At block 502, processor 307 may also receive/capture a resource file for the software product including text strings for respective text fields of the GUI screens.

At block 503, processor 307 may assign a unique text string identification (e.g., 02aq, 03br, 04cs, etc.) to each test string of the resource file for the software product, and at block 504, processor 307 may generate a text mapping file including a module for each text field of the resource file. As shown in FIGS. 8A, 8B, and 8C, for example, the module for a text field may include a screen identification for the GUI screen on which the text field is used, the respective text string from the resource file with the text string identification appended thereto, and information (e.g., coordinate/dimension information) defining a location of the text field.

At block 505, processor 307 may provide a list of the GUI screens, and at block 507, processor 505 may transmit the list of GUI screens through network interface 309 and network(s) 115 to remote editor workstation 101. As discussed above, the list of GUI screens may include information allowing editor workstation 101 to generate the list of GUI screen names of FIG. 6. The list of GUI screens may include a list of screen names, a list of screen identifications, or a list of both screen names and identifications (as shown in FIG. 6). Moreover, the list of GUI screens may provide sufficient information to allow a user of editor workstation 101 to select one of the GUI screens for translation and for editor workstation 101 to transmit a request for the selected GUI screen (see block 407 of FIG. 4).

Processor 307 may then receive selection of one of the product screens through network interface 309 and network(s) 115 from remote editor workstation 101 at block 509 (see block 407 of FIG. 4). For example, editor workstation 101 may request GUI screen 571_2014303040_0.png from the list of FIG. 6, resulting in the generation of the screenshot of FIG. 7 including three text fields 711, 715, and 717 based on the text mapping file. Responsive to receiving selection of the GUI screen (e.g., corresponding to the screenshot of FIG. 7) through network interface 309 and network(s) 115 from remote editor workstation 101 at block 509, processor 307 may transmit the screenshot of FIG. 7 for the selected GUI screen through network interface 309 and network(s) 115 to remote editor workstation 101 at block 515. As discussed above with respect to FIG. 4, the translator at editor workstation 101 may select/translate one or more of the text fields of the screenshot, and when the translator updates a text field, editor workstation 101 may transmit the new text to the translation server 105 (see blocks 415, 417, 419, and 421 of FIG. 4).

At block 517, processor 307 may receive the new text for one of the text fields (e.g., the first text field), and at block 519, processor 307 may update the respective module of the text mapping file with the new text. Referring to FIGS. 7, 9A, and 9B, text field 711 may originally include the text "Password" with the text mapping file module of FIG. 8A, and responsive to user entry of the text "Mot De Passe" as discussed above, processor 307 may update the text mapping file module as shown in FIG. 10A to include: the screen identification (571_2014303040_0.png) of the GUI screen; the new text ("Mot De Passe") for the text field 711 with the identification (02aq) of the text field appended thereto; and the information defining the location of the text field. Responsive to receiving the new text for the text field 711 at block 517, processor 307 may provide the update the screenshot at block 520 including the first text field 711 with the new text and to include the second and third text fields 715 and 717 with the (original) second and third text, for example, as shown in FIG. 9C. For example, the updated screenshot may be provided at block 520 through network interface 309 and network 115 to remote editor workstation 101, with the updated screenshot including the first text field 711 with the new text ("Mot De Passe") and the second text field with the (original) second text ("Identification") and the third text field with the (original) third text ("Sign In"). The updated screenshot of FIG. 9C may thus be provided for display on display 203 of editor workstation 101.

Processor 307 may repeat operations of blocks 517, 519, 520, 521, and 523 for each of the text fields of the screenshot (corresponding to the selected GUI screen) any number of times until either the session ends at block 521 (e.g., responsive to an instruction/notification from editor workstation that the session has ended) or the selected screenshot has been closed at block 523 (e.g., responsive to an instruction/notification from editor workstation 101 that the selected screen has been closed). Processor 307 may repeat operations of blocks 507, 509, 515, 517, 519, 520, 521, and 523 for each of the GUI screens of the software product (included in the list of block 507) any number of times until the session ends at block 521.

When the session is ended at block 521, all text string translations (also referred to as new text) that have been entered will be saved in the respective modules of the text mapping file for the software product. Using the text string identifications in the respective modules, processor 307 can use the text mapping file to generate a new resource file (e.g., a new i18n resource file) for the software product including the new text strings at block 525. Like the original resource file for the software product, the new resource file may not include the text string identifications of the text mapping file. Accordingly, GUI screens generated using the new resource file will not include the text string identifications appended to the respective text strings as shown in the screenshots of FIGS. 7 and 9A-F. At block 527, processor 307 may transmit the new resource file with the translated text strings (e.g., "Mot De Passe" for text field 711 and "Se Connecter" for text field 717) to product server 109 so that a localization build of the software product can be completed.

By assigning the text string identifications, providing the text mapping file with modules including the text string identifications, and appending the text string identifications to the screenshots used for translation, each text string can be uniquely identified by the translator even when two different text fields (of the same or different GUI screens) include the same text string. Accordingly, the translator may more easily provide different translations of the same text string in different text fields where the context may be different. The text string identifications may further facilitate generation of the new resource file.

According to some embodiments, metadata (e.g., an XML metadata file) may be provided for the software product being translated, with the metadata identifying each GUI screen of the software product. Translation server processor 307 may thus use the metadata to obtain each GUI screen of the software product at block 502 of FIG. 5. Accordingly, processor 307 may automatically obtain screenshots of each possible GUI screen (e.g., including each possible page, dropdown menu, text box, etc.) for which translation may be required. An example of such an XML metadata file is provided below wherein processor 307 may read this file and execute the steps to reach out to each GUI screen of the software product at product server 109.

Example of XML metadata file:

```
<component1 Elements='(library)'>
    <C Elements='(advSearch-Scr)|(toolbarLib-Scr)*'>
    </C>
    <R Elements='(table_Lib){12,16,23}'>
        <C Elements='(OpenProp-Scr)'>
            <C Elements='(props-Scr)*'>
            </C>
        </C>
    </R>
    <R Elements='(table_Lib){23}'>
        <C Elements='(OpenVersion-Scr)'>
        </C>
    </R>
    <R Elements='(table_Lib){15,17,18,20}'>
        <C Elements='(Edit-Scr)'>
            <W Elements='(newTab)'>
                <C Elements='(tabList-Scr)*'>
                </C>
            </W>
        </C>
    </R>
</component1>
```

The Elements attributes are XPath expressions which may be defined in the element_libraray.xml as follows:

```
<component1>//li[contains(@id,'LIBRARY_BROWSER_header')]//span//span</component1>
    <advSearch-screen>//a[contains(@id,'advSearchLink')]
    </advSearch-screen>
    <option>(//div[contains(@class,'x-grid3-hd-checker')])
    </option>
    <toolbarLib-screen>//table[contains(@id,'libbr.toolBar')]
    </toolbarLib-screen>
    <OpenVersion-screen>(//a[contains(@id,'libBr.menu')])[10]
```

-continued

```
    </OpenVersion-screen>
    <OpenProp-screen>(//a[contains(@id,'libBr.menu')])[5]
    </OpenProp-screen>
    <Edit>(//a[contains(@id,'libBr.menu')])[1]
    </Edit>
    <propTabs-screen>//li[contains(@id,'libbr.prop')]//span//span
    </propTabs-screen>
    <tabList-screen>(//ul[contains(@role,'tablist')])//span//span
    </tabList-screen>
    <newTab>//body</newTab>
```

In addition, the usage, tag name may be defined as "action", and some pattern may be used to manipulate not only one element at one time:
<!--Tag usage:
  C:Click
  D:DoubleClick
  R:RightClick
  W:Switch to new Window or new Tab
  L:Dropdown List. Limitation: Not supported yet
  I:Input values in input filed. Limitation: Not supported yet
Pattern usage:
  ( ): The XPATH expression defined in elements.xml.
  *: Find all matched DOM nodes and then cycle one by one. Limitation: This pattern should only be used at the lowest level of the tree.
  { }: Match specified DOM node. Use "," to seperate multiple nodes. Limitation: "-" is not supported yet.
  |: Seperate multiple element expression.
-->

According to some embodiments disclosed herein, processor 307 may use the software product metadata (e.g., XML metadata) to drive a web browser (e.g., browser program 331 of FIG. 3, such as Internet Explorer, Netscape Navigator, etc.) to capture/obtain (see block 502 of FIG. 5) the specific GUI screens of the software product residing on/at product server 109. The software product metadata (e.g., XML metadata) for the software product may thus act as a site map for processor 307 to obtain/capture the GUI screens of the software product. Translation server 105 may thus operate as a browser in a browser/server environment so that special client software is not required when obtaining/capturing GUI screens from product server 109 acting as a web server. A screenshot for each GUI screen may thus be taken from a window of the web browser.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be stored in memory and provided to a processor (also referred to as a processor circuit) of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method supporting editing of a software product, the method comprising:
   obtaining a graphical user interface (GUI) screen for the software product, wherein the GUI screen includes a plurality of text fields, and wherein a first resource file includes text strings for respective ones of the text fields;
   generating a text mapping file for the software product, wherein the text mapping file includes a module for each text string of the first resource file, wherein the module for each text string includes a text string from the resource file and a unique text string identification for the text string, and wherein the screenshot of the GUI screen for the software product includes the first text field with a first unique text string identification from the first module appended to the original first text string and the second text field with a second unique text string identification from the second module appended to the original second text string;
   providing a screenshot of the GUI screen for the software product for display on a display wherein the screenshot includes a first text field with an original first text string for the GUI screen from a respective first module of the text mapping file and a second text field with an original second text string for the GUI screen from a respective second module of the text mapping file;
   receiving user input of a new first text string for the first text field;
   responsive to receiving user input of the new first text string, updating the first module of the text mapping file to replace the original first text string of the first text field for the GUI screen with the new first text string of the first text field for the GUI screen;
   responsive to receiving user input of the new first text string, modifying the screenshot to provide a modified screenshot of the GUI screen for the software product for display on the display wherein the modified screenshot includes the first text field with the new first text string from first module of the text mapping file and the second text field with the original second text string for the GUI screen from the second module of the text mapping file, wherein the modified screenshot of the GUI screen including the first text field with the new first text string and the second text field with the original second text string for the GUI screen replaces the screenshot of the GUI screen on the display, and wherein the modified screenshot of the GUI screen for the software product includes the first text field with the first unique text string identification from the first module appended to the new first text string and the second text field with the second unique text string identification from the second module appended to the original second text string; and
   providing a second resource file including the new first text string for the first text field of the GUI screen;
   wherein the new first text string replaces the original first text string in the first text field in the modified screenshot on a first area of the display, and wherein the original second text string is maintained in the second text field in the modified screenshot on a second area of the display.

2. The method of claim 1, wherein the modified screenshot is a first modified screenshot, wherein the method further comprises:
   after modifying the screenshot to provide the first modified screenshot, receiving user input of a new second text string for the second text field;
   responsive to receiving user input of the new second text string, updating the second module of the text mapping file to replace the original second text string of the second text field for the GUI screen with the new second text string of the second text field for the GUI screen; and
   responsive to receiving user input of the new second text string, modifying the first modified screenshot of the GUI screen to provide a second modified screenshot for the software product for display on the display wherein the second modified screenshot includes the first text field with the new first text string from first module of the text mapping file and the second text field with the new second text string for the GUI screen from the second module of the text mapping file, wherein the second modified screenshot of the GUI screen including the first text field with the new first text string and the second text field with the new second text string for the GUI screen replaces the first modified screenshot of the GUI screen on the display;
   wherein providing the second resource file includes generating the second resource file to include the new first text string for the first text field and the new second text string for the second text field of the GUI screen.

3. The method of claim 2 wherein the second resource file includes the new first text string without the first unique text string identifier and wherein the second resource file includes the second new text string without the second unique text string identifier.

4. The method of claim 2 wherein the second modified screenshot of the GUI screen for the software product includes the first text field with the first unique text string identification from the first module appended to the new first text string and the second text field with the second unique text string identification from the second module appended to the new second text string.

5. The method of claim 1 wherein obtaining comprises obtaining a plurality of graphical user interface (GUI) screens for the software product, wherein each of the plurality of GUI screens is associated with a respective screen identification, wherein each of the GUI screens includes a plurality of text fields, and wherein the first resource file includes text strings for respective ones of the text fields of the plurality of GUI screens, and wherein generating the text mapping file comprises generating the text mapping file for the plurality of GUI screens of the software product, wherein the module for each text string includes the text string from the resource file, a screen identification of the respective GUI screen on which the text string is used, and the unique text string identification for the text string, and wherein providing the first screen shot is responsive to receiving user selection of the GUI screen.

6. The method of claim 5, wherein the screenshot is a first screenshot, wherein the modified screenshot is a modified first screenshot, the method further comprising:

responsive to receiving user selection of a second one of the GUI screens after modifying the first screenshot, providing a second screenshot wherein the second screenshot is a screenshot of the second selected GUI screen for the software product for display on the display wherein the second screenshot includes a third text field with an original third text string for the second selected GUI screen from a respective third module of the text mapping file and a fourth text field with an original fourth text string for the second selected screen from a respective fourth module of the text mapping file;

receiving user input of a new third text string for the third text field;

responsive to receiving user input of the new third text string, updating the third module of the text mapping file to replace the original third text string of the third text field for the second selected GUI screen with the new third text string of the third text field for the second selected GUI screen; and responsive to receiving user input of the new third text string, modifying the second screenshot to provide a modified second screenshot of the second selected GUI screen for the software product for display on the display wherein the modified second screenshot of the second selected GUI screen includes the third text field with the new third text string from third module of the text mapping file and the fourth text field with the original fourth text string for the second selected GUI screen from the fourth module of the text mapping file, wherein the modified second screenshot of the second selected GUI screen including the third text field with the new third text string and the fourth text field with the original second text string for the second selected GUI screen replaces the first second screenshot of the second selected GUI screen on the display;

wherein the second resource file includes the new first text string for the first text field of the first selected GUI screen and the new third text string for the third text field of the second selected GUI screen;

wherein the new third text string replaces the original third text string in the third text field in the modified second screenshot on a third area of the display, and wherein the original fourth text string is maintained in the fourth text field in the modified second screenshot on a second area of the display.

7. The method of claim 5 wherein the module for each text string in the text mapping file includes the respective screen identification, the unique text string identification, and information defining an area of the respective GUI screen for the respective text field.

8. The method of claim 7 further comprising:
before receiving user input of the new first text string, receiving user selection of the first text field using a pointer device to select an area of the screenshot of the GUI screen on the display defined by the first module of the text mapping file; and
responsive to receiving user selection of the first text field by using the pointer device to select the area of the screenshot of the GUI screen on the display, providing a prompt for entry of the new third text string;
wherein receiving user input of the new first text string comprises receiving user input of the new first text string using the prompt.

9. The method of claim 5 wherein receiving user selection of the GUI screen comprises receiving user selection of the GUI screen using a pointer device to select the GUI screen from a list of the plurality of GUI screens.

10. The method of claim 5 wherein obtaining the plurality of GUI screens comprises automatically obtaining the GUI screens using a metadata file defining the GUI screens for the software program.

11. The method of claim 10 wherein obtaining the plurality of GUI screens comprises automatically obtaining the GUI screens using the metadata file defining the GUI screens for the software program to drive a web browser, and taking a screenshot of each of the GUI screens from a window of the web browser.

12. The method of claim 1, wherein the first module of the text mapping file includes the respective text string from the first resource file, a screen identification for the GUI screen, a first text string identification for the first text field, and first information defining an area of the GUI screen for the first text field, and wherein the second module of the text mapping file includes the respective text string from the first resource file, the screen identification of the GUI screen, a second text string identification for the second text field, and second information defining an area of the GUI screen for the second text field.

13. The method of claim 1 wherein the first resource file is a first i18n resource file and the second resource file is a second i18n resource file.

14. The method of claim 1 further comprising:
before providing the screenshot of the GUI screen, providing a list of the GUI screens on a display, wherein the screenshot is provided responsive to receiving the user selection of the one of the GUI screens using the list of the GUI screens on the display.

15. The method of claim 1 wherein obtaining the GUI screen comprises obtaining the GUI screen from a remote product server, the method further comprising:
transmitting the second resource file to the remote product server.

16. The method of claim 1 wherein the original first text string is in a first language, and wherein the new first text string is a translation of the original first text string into a second language different than the first language.

17. The method of claim 1 wherein modifying the screenshot to provide the modified screenshot comprises directly modifying the screenshot to provide the modified screenshot.

18. A translation server comprising:
a processor circuit with the processor circuit being
to obtain a graphical user interface (GUI) screen for a software product, wherein the GUI screen includes a plurality of text fields, and wherein a first resource file includes text strings for respective ones of the text fields;
to generate a text mapping file for the software product, wherein the text mapping file includes a module for each text string of the first resource file, wherein the module for each text string includes a text string from the resource file and a unique text string identification for the text string;
to provide a screenshot of the GUI screen for the software product for display on a display wherein the screenshot includes a first text field with an original first text string for the GUI screen from a respective first module of the text mapping file and a second text field with an original second text string for the GUI screen from a respective second module of the text mapping file, wherein the screenshot of the GUI screen for the software product includes the first text field with a first unique text string identification from the first module appended to the original first text string and the second text field with a second unique text string identification from the second module appended to the original second text string;

to receive user input of a new first text string for the first text field;

to update the first module of the text mapping file to replace the original first text string of the first text field for the GUI screen with the new first text string of the first text field for the GUI screen responsive to receiving user input of the new first text string;

to modify the screenshot of the GUI screen to provide a modified screenshot for the software product for display on the display wherein the modified screenshot includes the first text field with the new first text string from first module of the text mapping file and the second text field with the original second text string for the GUI screen from the second module of the text mapping file responsive to receiving user input of the new first text string, wherein the modified screenshot of the GUI screen including the first text field with the new first text string and the second text field with the original second text string for the GUI screen replaces the screenshot of the GUI screen on the display, and wherein the modified screenshot of the GUI screen for the software product includes the first text field with the first unique text string identification from the first module appended to the new first text string and the second text field with the second unique text string identification from the second module appended to the original second text string; and to generate a second resource file including the new first text string for the first text field of the GUI screen;

wherein the new first text string replaces the original first text string in the first text field in the modified screenshot on a first area of the display, and wherein the original second text string is maintained in the second text field in the modified screenshot on a second area the display.

19. The translation server of claim 18, wherein the modified screenshot is a first modified screenshot, the processor circuit being further to receive user input of a new second text string for the second text field after modifying the screenshot to provide the first modified screenshot for display;

to update the second module of the text mapping file to replace the original second text string of the second text field for the GUI screen with the new second text string of the second text field for the GUI screen responsive to receiving user input of the new second text string, and to modify the first modified screenshot to provide a second modified screenshot of the GUI screen for the software product for display on the display wherein the second modified screenshot includes the first text field with the new first text string from first module of the text mapping file and the second text field with the new second text string for the GUI screen from the second module of the text mapping file responsive to receiving user input of the new second text string, wherein the second modified screenshot of the GUI screen including the first text field with the new first text string and the second text field with the new second text string for the GUI screen replaces the first modified screenshot of the GUI screen on the display, wherein generating the second resource file includes generating the second resource file to include the new first text string for the first text field and the new second text string for the second text field of the GUI screen.

20. The translation server of claim 18, further comprising:

a network interface coupled with the processor circuit, the network interface being to communicate through a data network with a product server;

wherein the processor circuit is being to obtain the graphical user interface screen through the network interface and the data network from a remote product server.

21. A computer program product supporting editing of a software product, the computer program product comprising:

a computer readable storage medium comprising computer readable program code embodied therein, the computer readable program code comprising:

computer readable program code to obtain a graphical user interface (GUI) screen for the software product, wherein the GUI screen includes a plurality of text fields, and wherein a first resource file includes text strings for respective ones of the text fields;

computer readable program code to generate a text mapping file for the software product, wherein the text mapping file includes a module for each text string of the first resource file, wherein the module for each text string includes a text string from the resource file and a unique text string identification for the text string;

computer readable program code to provide a screenshot of the GUI screen for the software product for display on a display wherein the screenshot includes a first text field with an original first text string for the GUI screen from a respective first module of the text mapping file and a second text field with an original second text string for the GUI screen from a respective second module of the text mapping file, wherein the screenshot of the GUI screen for the software product includes the first text field with a first unique text string identification from the first module appended to the original first text string and the second text field with a second unique text string identification from the second module appended to the original second text string;

computer readable program code to receive user input of a new first text string for the first text field;

computer readable program code to update the first module of the text mapping file to replace the original first text string of the first text field for the GUI screen with the new first text string of the first text field for the GUI screen; responsive to receiving user input of the new first text string;

computer readable program code to modify the screenshot to provide a modified screenshot of the GUI screen for the software product for display on the display wherein the modified screenshot includes the first text field with the new first text string from first module of the text mapping file and the second text field with the original second text string for the GUI screen from the second module of the text mapping file responsive to receiving user input of the new first text string, wherein the modified screenshot of the GUI screen including the first text field with the new first text string and the second text field with the original second text string for the GUI screen replaces the screenshot of the GUI screen on the display, and wherein the modified screenshot of the GUI screen for the software product includes the first text field with the first unique text string identification from the first module appended to the new first text string and the second text field with the second unique text string identification from the second module appended to the original second text string; and computer readable program code to provide a second resource file including the new first text string for the first text field of the GUI screen;

wherein the new first text string replaces the original first text string in the first text field in the modified screenshot on a first area of the display, and wherein the original second text string is maintained in the second text field in the modified screenshot on a second area of the display.

* * * * *